United States Patent
Gupta et al.

(10) Patent No.: US 7,622,160 B2
(45) Date of Patent: Nov. 24, 2009

(54) METHOD FOR CONCURRENT THERMAL SPRAY AND COOLING HOLE CLEANING

(75) Inventors: Bhupendra K. Gupta, Cincinnati, OH (US); Ray Heidorn, Cincinnati, OH (US); Tom Tomlinson, West Chester, OH (US); Mark M Glevicky, Cincinnati, OH (US); George E Moertle, Cincinnati, OH (US); Thomas George Holland, Dayton, OH (US)

(73) Assignee: General Electric Company, Schenectady, NY (US)

( * ) Notice: Subject to any disclaimer, the term of this patent is extended or adjusted under 35 U.S.C. 154(b) by 288 days.

(21) Appl. No.: 11/460,664

(22) Filed: Jul. 28, 2006

(65) Prior Publication Data

US 2009/0226626 A1    Sep. 10, 2009

(51) Int. Cl.
B05D 1/32    (2006.01)
C23C 4/00    (2006.01)
C23C 4/06    (2006.01)
C23C 4/10    (2006.01)

(52) U.S. Cl. .................. 427/448; 427/454; 427/455; 427/456; 427/446

(58) Field of Classification Search .................. 427/448
See application file for complete search history.

(56) References Cited

U.S. PATENT DOCUMENTS

| | | | |
|---|---|---|---|
| 1,654,509 A | 12/1927 | Claus | |
| 3,340,084 A | 9/1967 | Eisenlohr | |
| 4,224,356 A | 9/1980 | Singer | |
| 4,338,360 A | 7/1982 | Cavanagh et al. | |
| 4,386,112 A | 5/1983 | Eaton et al. | |
| 4,402,992 A * | 9/1983 | Liebert | 427/456 |
| 4,743,462 A | 5/1988 | Radzavich et al. | |
| 5,941,686 A | 8/1999 | Gupta et al. | |
| 6,004,620 A * | 12/1999 | Camm | 427/142 |
| 6,335,078 B2 | 1/2002 | Venkataramani et al. | |
| 6,365,013 B1 * | 4/2002 | Beele | 204/192.16 |
| 6,403,165 B1 | 6/2002 | Grylls et al. | |
| 6,620,457 B2 * | 9/2003 | Farmer et al. | 427/235 |
| 6,623,790 B2 | 9/2003 | Fernihough et al. | |
| 6,667,076 B2 * | 12/2003 | Fried et al. | 427/448 |
| 2001/0001680 A1 | 5/2001 | Farmer et al. | |
| 2005/0084657 A1 | 4/2005 | Ohara | |
| 2005/0126001 A1 * | 6/2005 | Hanley | 29/889.1 |
| 2005/0191422 A1 | 9/2005 | Fernihough et al. | |
| 2006/0016191 A1 | 1/2006 | Woodcock et al. | |
| 2006/0059918 A1 | 3/2006 | Caldwell et al. | |

FOREIGN PATENT DOCUMENTS

| | | |
|---|---|---|
| EP | 0808913 A1 | 11/1997 |
| EP | 1340587 A2 | 3/2003 |
| JP | 2001349201 A1 | 12/2001 |

* cited by examiner

*Primary Examiner*—Katherine A Bareford
(74) *Attorney, Agent, or Firm*—McNees Wallace & Nurick, LLC

(57) ABSTRACT

A method for applying a thermal barrier coating to an article having cooling holes and concurrently cleaning obstructions, such as TBC overspray or other debris, from those holes is disclosed. A thermal barrier coating is applied to a first surface of an article having cooling holes. Concurrently therewith, a plurality of particles are projected against a second surface of the article, such that at least some of the particles pass through the cooling holes, strike the overspray constituents prior to cooling, knocking at least some of the obstructions out of the cooling hole.

19 Claims, 5 Drawing Sheets

METHOD FOR CONCURRENT THERMAL SPRAY AND COOLING HOLE CLEANING

FIELD OF THE INVENTION

The present invention is directed to methods of applying a thermal spray coating to an article having one or more cooling holes and more particularly to methods of thermal spraying an article having one or more cooling holes and cleaning the cooling holes of the article to remove obstructions resulting from overspray or other debris of thermal spraying.

BACKGROUND OF THE INVENTION

In gas turbine engines, such as aircraft engines for example, air is drawn into the front of the engine, compressed by a shaft-mounted rotary-type compressor, and mixed with fuel. The mixture is burned, and the hot exhaust gases are passed through a turbine mounted on the same shaft as the compressor. The flow of gas turns the turbine, which turns the shaft and drives the compressor and fan. The hot exhaust gases flow through the engine nozzle at the back of the engine, generating thrust to propel the aircraft forward.

During operation of gas turbine engines, the temperatures of combustion gases may exceed 1650° C. (3000° F.), considerably higher than the melting temperatures of the metal parts of the engine which are in contact with these gases. Operation of these engines at gas temperatures that are above the metal part melting temperatures is a well established art, and depends in part on supplying a cooling air to the outer surfaces of the metal parts through various methods. The metal parts of these engines that are particularly subject to high temperatures, and thus require particular attention with respect to cooling, are the metal parts forming combustors and parts located aft of the combustor.

The metal temperatures can be maintained below melting levels by using thermal barrier coatings (TBCs), often in combination with various cooling hole designs incorporated into some engine components. The TBC is typically applied to the component by a thermal spray process. However, the thermal spray process often results in overspray that partially or completely blocks the component's cooling holes. The percent blockage typically increases substantially as the thickness of the TBC grows.

As a result, present thermal spray and cleaning processes involve a multi-step, highly labor intensive process of applying a partial layer of TBC coating, allowing the component and the TBC to sufficiently cool to a temperature at which the component can easily be handled, removing the component from an application fixture on which the thermal spraying takes place, and removing any masking, which is then followed by separately removing the well-cooled, solidified coating from the cooling holes using a water jet or other cleaning methods. To prevent the cooling holes from becoming obstructed beyond a level from which they can be satisfactorily cleaned, only a fraction of the desired TBC thickness is applied prior to cleaning. As a result, the entire process must typically be repeated several times until the desired TBC thickness is reached. This complex process results in low productivity, high cycle time, and increases costs by a factor of five to ten times that of applying the same TBC to a similar non-holed part.

What is needed is a method for applying a TBC or other coating by a thermal spray process to an article having cooling holes and cleaning those holes concurrent with the thermal spray process to reduce time and monetary costs associated with current incremental, multi-stage coating and cleaning processes.

SUMMARY OF THE INVENTION

A method for applying a thermal barrier coating to an article having cooling holes and concurrently cleaning obstructions, such as TBC overspray or other debris, from those holes is disclosed. The method comprises providing an article having a first surface and a second surface, the article having one or more cooling holes extending from an opening in the first surface to an opening in the second surface, thermal spraying a layer of material overlying the first surface of the article, wherein thermal spray debris creates an obstruction that at least partially obstructs at least one cooling hole, and concurrently projecting a plurality of particles toward the second surface of the article, at least some of the particles passing through the cooling hole at the second surface opening and removing at least a portion of the obstruction from the cooling hole.

One advantage of exemplary embodiments of the invention is that time and cost savings may be achieved by reducing or eliminating masking and other time consuming steps associated with separate thermal spray and cleaning processes.

Another advantage is that concurrent spray and cleaning processes may reduce the number of stations needed, in that an article can be sprayed and cleaned at a single location.

Another advantage is that a thermal barrier coating may be applied to its full desired thickness in a single stage without interruption.

Yet another advantage of the invention is that concurrent cleaning of cooling holes with thermal spraying permits cleaning overspray from the holes while the applied barrier coating constituents are still warm and pliable, increasing the effectiveness of debris removal over comparable cleaning techniques used after the TBC and the component to which the TBC was applied have substantially cooled and hardened.

Still another advantage is that component quality may be improved by minimizing wall reduction in the cooling hole.

Other features and advantages of the present invention will be apparent from the following more detailed description of exemplary embodiments, taken in conjunction with the accompanying drawings which illustrate, by way of example, the principles of the invention.

DETAILED DESCRIPTION OF EXEMPLARY EMBODIMENTS

Figure 1:
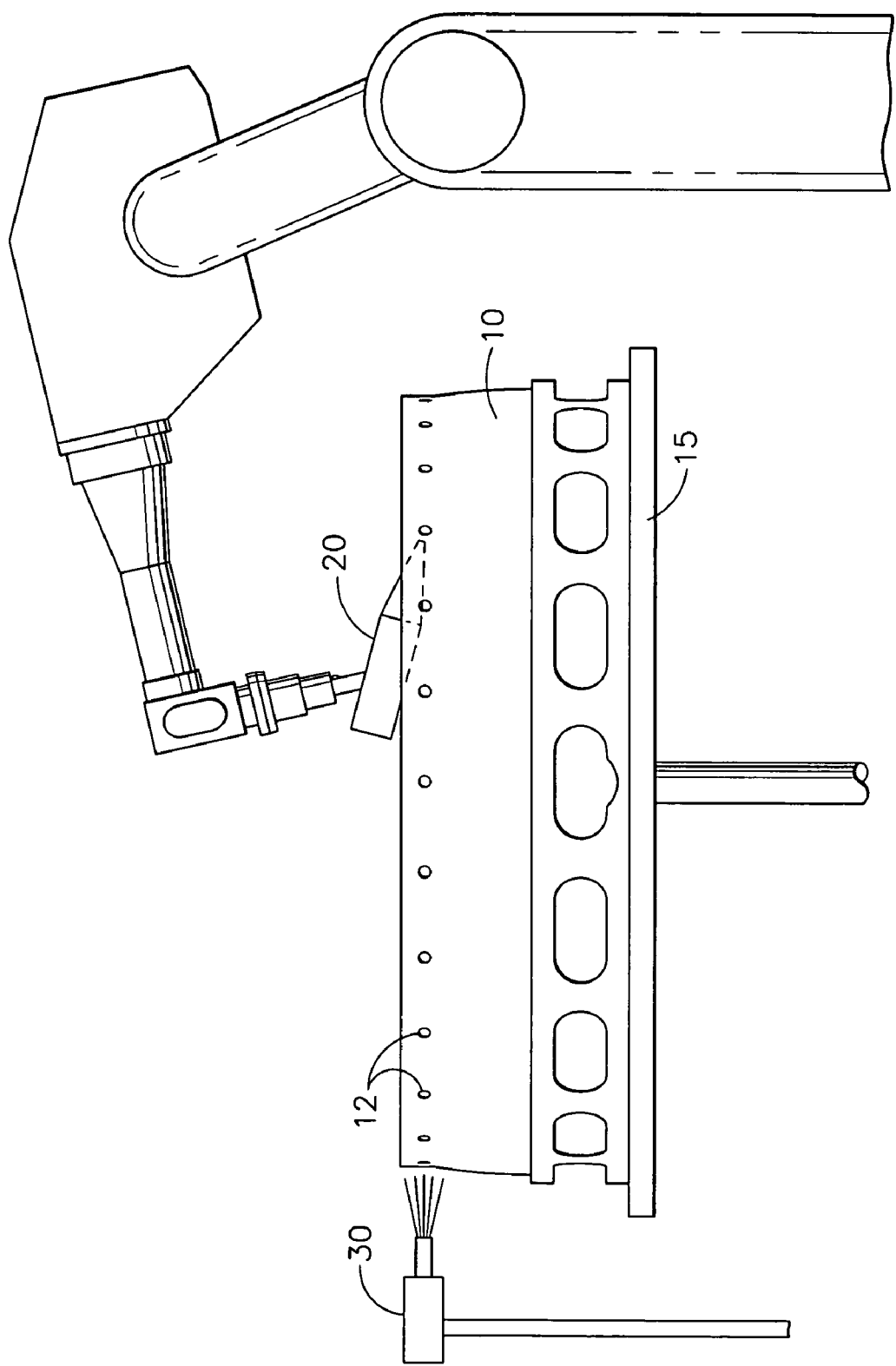
FIG. 1 is a thermal spray station for use with methods according to exemplary embodiments of the invention.

Referring to FIG. 1, an article 10 having cooling holes 12, such as a combustor liner or other component of a gas turbine engine is provided to which a TBC or other coating may be applied by thermal spray. A thermal spray device 20 is positioned to apply a TBC 22 to the inner surface of the combustor liner 10 (see FIG. 2). An abrasive non-metallic particle blaster (i.e. grit blaster) 30 is positioned to direct grit or other particles toward the outer surface of the combustor liner 10 and into the cooling holes 12. A rotatable table 15 may provide relative movement between the thermal spray device 20, the grit blaster 30, and the combustor liner 10.

Figure 2:
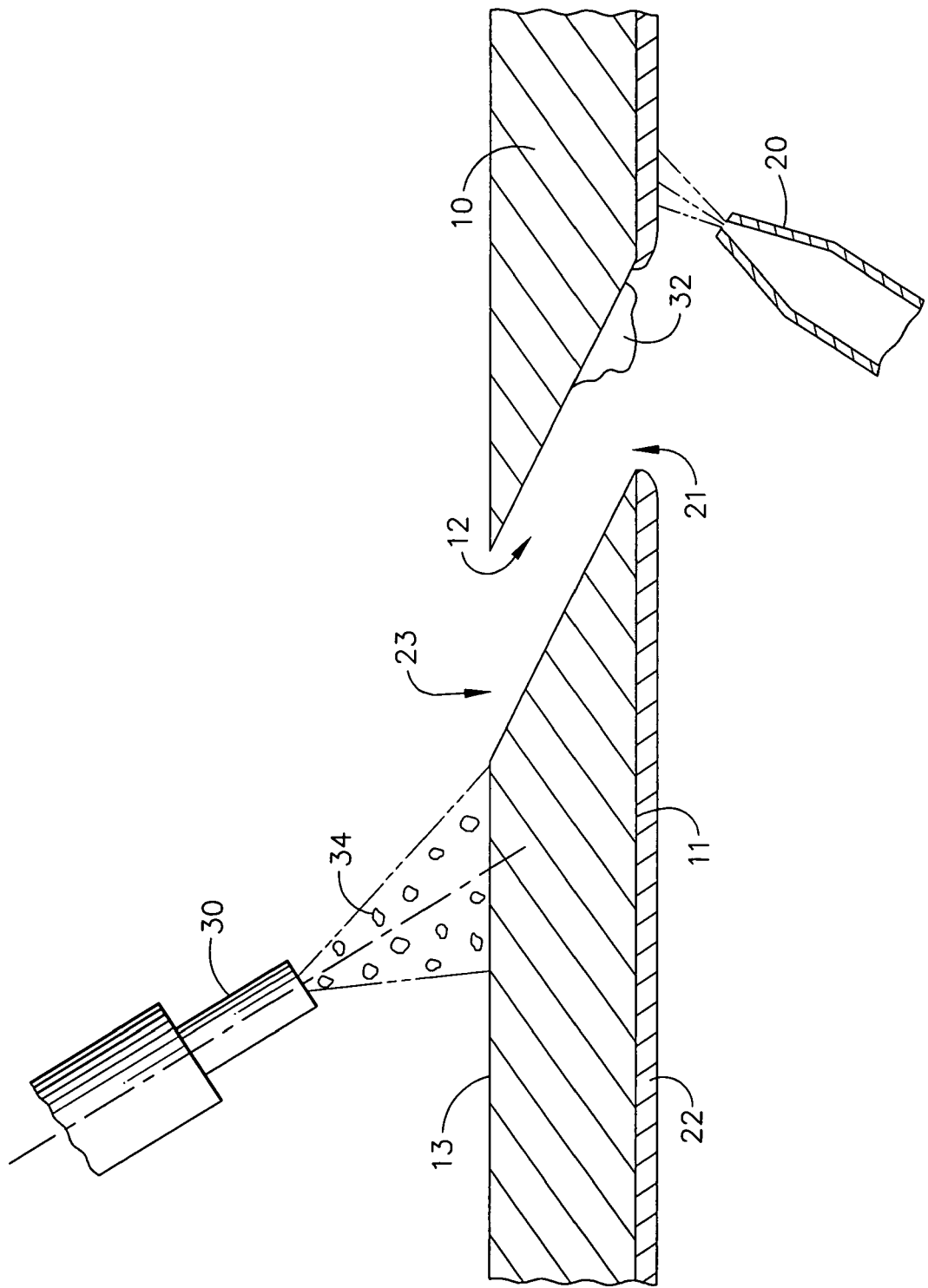
FIG. 2 is an enlarged sectional view of a combustor liner for use with thermal spray methods according to exemplary embodiments of the invention.

As better seen with reference to FIG. 2, the cooling holes 12 extend from an opening 21 in a first surface 11 of the combustor liner 10 to which a TBC 22 is applied to a second opening 23 in a second surface 13 of the combustor liner 10.

The TBC 22 comprises one or more layers of metal and/or ceramic coating material applied to the surface of metal parts to impede the transfer of heat from hot combustion gases to the metal parts, thus insulating the component from the hot combustion gas. The presence of the TBC 22 on the surface permits the combustion gas to be hotter than would otherwise be possible with the particular material and fabrication process of the component. Any suitable composition of TBC 22 desired may be applied. In the case of combustor liners 10, one suitable TBC 22 comprises a bond layer of MCrAlY, wherein M is preferably Ni, Co, or a combination thereof, followed by a layer of yttria stabilized zirconia (YSZ).

Combustor liners typically have an annular geometry, and as a result, the first surface 11 to which the TBC 22 is applied is usually the inner surface of the combustor liner 10. The second, outer, surface 13 is exposed to bypass cooling gases during operation and may be left untreated for more efficient heat transfer. As such, the thermal spray device 20, such as an air plasma spray gun, is positioned to apply the TBC 22 to the inner surface 11 of the combustor liner 10.

To apply the TBC 22 evenly over the entire first surface 11 of the combustor liner 10, the spray device 20 may be moved with respect to the combustor liner 10 or vice versa, or some combination of the two may be employed. In accordance with some methods of applying a TBC 22 to an annular component, such as a combustor liner 10, the combustor liner 10 is positioned on the rotatable table 15. To assist in even application of the coating, the table 15 may be rotated at any speed, typically about 50 to 75 rotations per minute, while the thermal spray device 20 and grit blaster 30 are stationary. The relative motion may result in depositing a coating approximately one micron thick on the first surface 11 of the combustor liner 10 each time a particular point passes the spray device 20. It will be appreciated that the TBC 22 may be applied to any desired thickness, although a thickness of about 127 microns to about 254 microns (about 5 mils to about 10 mils) for MCrAlY and a thickness of about 254 microns to about 508 microns (about 10 mils to about 20 mils) for YSZ is typical.

As the combustor liner 10 rotates on the table 15, thermal spray debris, such as overspray, may form obstructions 32 in the cooling holes. These obstructions 32 may partially or completely block the cooling holes 12, thus decreasing or eliminating the cooling holes' ability to serve their intended purpose of cooling unless at least some of those obstructions 32 are removed.

In accordance with exemplary embodiments of the invention, a grit blaster 30 or other particle emitting device is provided for concurrent cleaning of the cooling holes 12 during the thermal spray process. The grit blaster 30 is configured to project small particles 34 toward the second surface 13 of the combustor liner 10. The second surface 13 toward which the particles 34 are projected may be any surface of the combustor liner 10 or other component in which the second cooling hole opening 23 is provided and which surface is other than the first surface 11. The second surface 13 is typically, but not necessarily, a surface opposite the first surface 11.

As the particles 34 strike the second surface 13 of the combustor liner 10, a portion of those particles pass into and through the cooling hole(s) 12 at the opening(s) 23 in the second surface 13, some or all of which cooling holes 12 are at least partially obstructed by TBC constituents or other debris that form the obstructions 32 resulting from the thermal spray process. The particles 34 are projected from one or more outlet nozzles of the grit blaster 30 aimed at the second surface 13 of the combustor liner 10. The grit blaster 30 imparts sufficient velocity to the particles 34 such that when the particles 34 strike the still warm and soft TBC constituents in the cooling hole 12, both the particles 34 and at least some of obstructions 32 are knocked from the cooling hole 12 via the first opening 21 in the first surface 11.

As described above, the grit blaster 30 is positioned for concurrent operation with the thermal spray device 20. By "concurrent" is meant that the particles 34 are projected from the grit blaster 30 against the second surface 13 and through the cooling holes 12 simultaneously or shortly after the TBC 22 is applied to the first surface 11 with the spray device 20, such that the TBC constituents have not cooled and solidified, but are sufficiently warm and soft enough to be knocked out of the cooling holes 12 by the particles 34 from the grit blaster 30. TBC constituents are typically still sufficiently warm and soft when the concurrent projecting of particles 34 toward the second surface 13 occurs within about 1 second of applying the TBC 22, although concurrent spraying within about 0.1 seconds of applying the thermal barrier coating is preferred, and may occur within about 0.01 seconds to simultaneously with applying the TBC 22.

Returning to FIG. 2, which illustrates an enlarged, sectional view of a portion of a combustor liner 10, the thermal spray device 20 may be positioned at any angle with respect to the first surface 11 of the combustor liner from about 20 degrees to about 230 degrees. More typically, the spray device 20 is angled at about 30 to about 55 degrees, and more typically at about 45 degrees. It will be appreciated that the cooling hole 12 may be angled as it passes from the first surface 11 to the second surface 13 through the combustor liner 10 or other engine component, thereby increasing the length of the hole through the component and providing a greater internal surface area for heat transfer. In cases of angled cooling holes, the spray device 20 is preferably angled to minimize the depth into the cooling hole 12 that overspray travels and the number of obstructions 32 which collect therein. This may be achieved by angling the spray device 20 against the angle of the cooling hole 12 at the first opening 21 as shown in FIG. 2.

The grit blaster 30 may have one or more outlet nozzles and may be configured to produce a converging or diverging stream of particles 34. The grit blaster 30 may be positioned at any angle with respect to the second surface 13, but is typically angled with the cooling hole 12, and in some circumstances may be aligned substantially parallel with the cooling hole 12. This may increase the depth to which the particles 34 from the grit blaster 30 travel prior to making contact with the internal walls of the cooling hole 12 or the TBC constituents forming obstructions 32 therein, thereby increasing the momentum with which those particles 34 strike those obstructions 32.

The particles 34 from the grit blaster 30 may be of any suitable material including alumina, sand, glass beads, or any other abrasive non-metallic material, by way of example only, and may be entrained in any suitable fluid, gaseous or liquid. Any desired mesh size grit may be selected, typically in the range of about 60 mesh grit to about 400 mesh grit. Likewise the pressure at which the grit blaster 30 is operated may be varied depending on the size of grit selected, but generally ranges from about 30 psi to about 90 psi.

Grit size of the particles from the grit blaster 30 and the angle of the thermal spray device 20 during application of the TBC 22 may impact the overall efficacy of the concurrent thermal spraying and cooling hole cleaning process. The comparative effects of modifying these features can be calculated by measuring the difference in air flow through the cooling holes of an uncoated component and air flow through cooling holes of a component that has been coated by thermal spraying and its cooling holes concurrently cleaned as described above.

Figure 3:
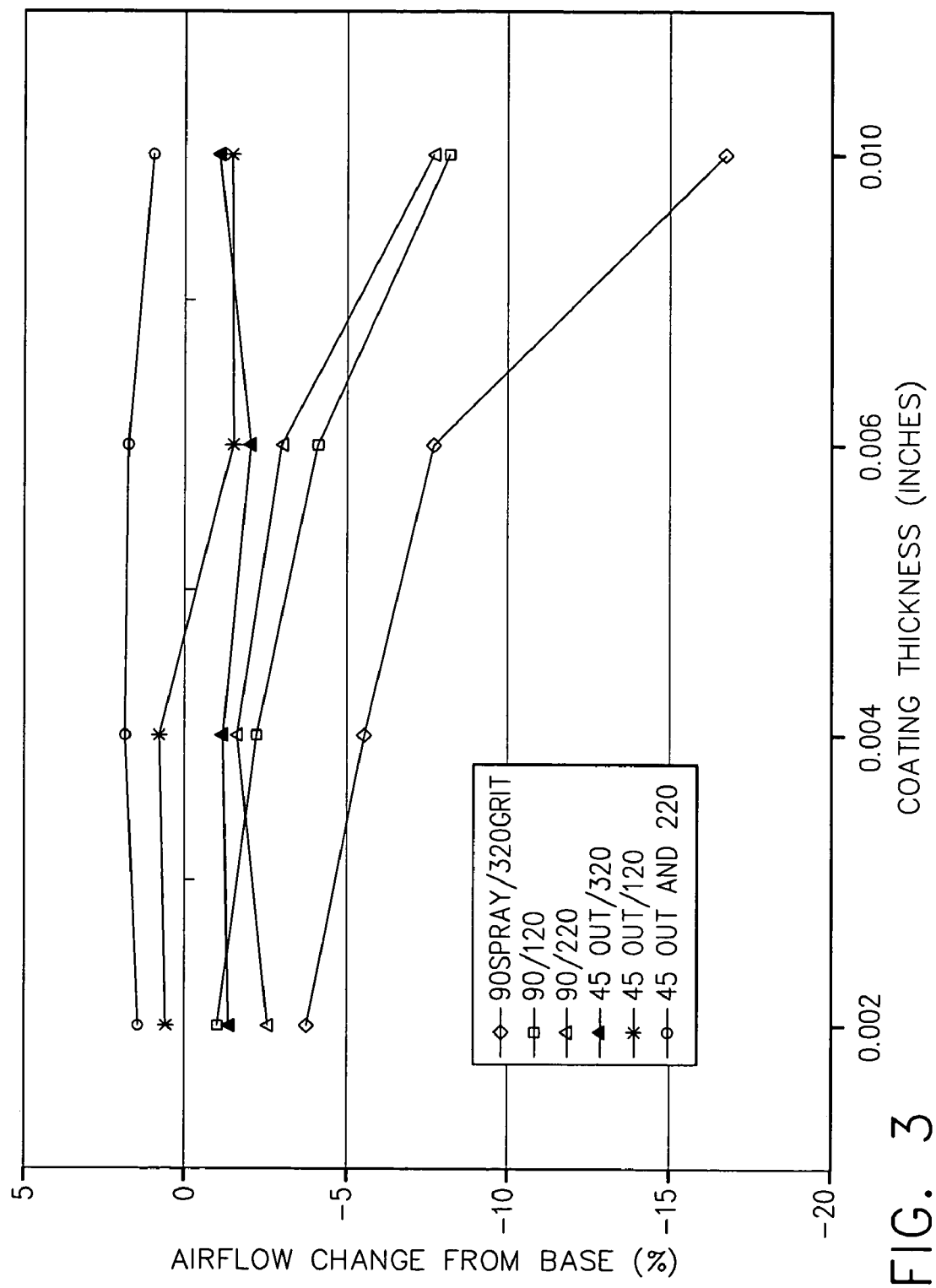
FIG. 3 is a chart showing change in air flow as a function of barrier coating thickness.

FIG. 3 illustrates results in chart form of sample materials having angled cooling holes to which a TBC was applied with concurrent grit blasting to clean the cooling holes in accordance with exemplary embodiments of the invention. A NiCrAlY coating was applied to HS188 samples by air plasma spraying at two different angles and to four levels of coating thickness. The angles of thermal spraying were (1) 90 degrees with respect to the first surface 11 and (2) 45 degrees with respect to the first surface 11, against the angle of the cooling hole 12 in the manner illustrated in FIG. 2. Alumina of three different grit sizes (120 mesh, 220 mesh and 320 mesh) entrained in air was used as blasting media for concurrent cooling hole cleaning at 60 psi during the thermal spray application.

After each sample was coated and its cooling holes cleaned, air was passed through the cooling holes and the mass flow rate measured at standard temperature and pressure. The measured air flow was compared against air flow through a control sample that was identical except that the control sample was uncoated and thus had cooling holes known to be free of any obstructions. The measured air flow through the sample was calculated as a percentage difference with respect to the air flow through the control and is shown plotted in FIG. 3 versus the thickness of the coating that was applied. Change in air flow of less than plus or minus 5% is particularly desirable.

Figure 4:
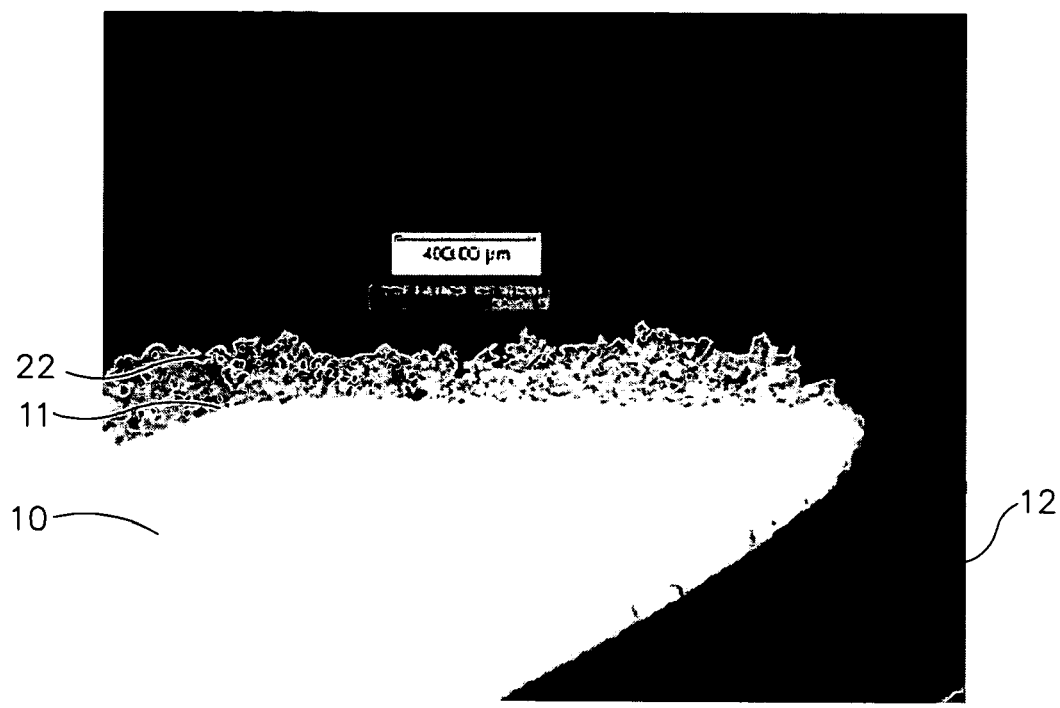
FIGS. 4 and 5 are optical micrographs showing a cooling hole of a coated article following thermal spray and concurrent hole cleaning performed in accordance with an exemplary embodiment of the invention.
Figure 5:
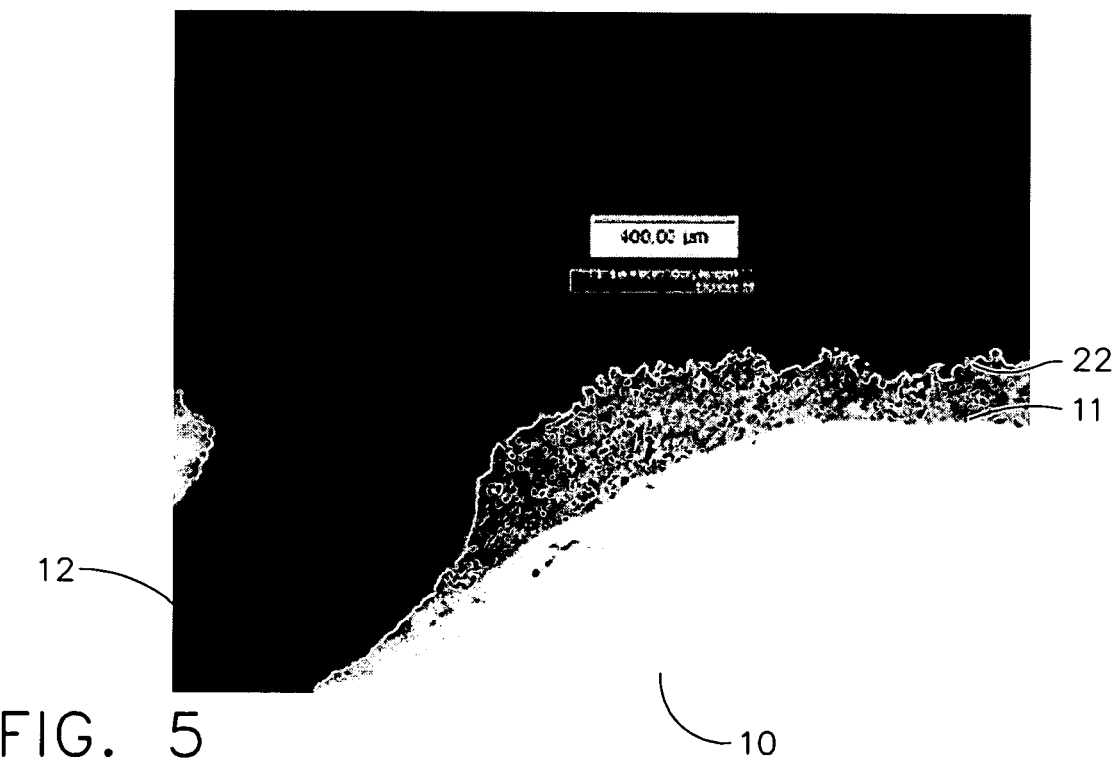

FIGS. 4 and 5 are optical micrographs of the sample component in which the NiCrAlY TBC 22 was applied by air plasma spraying at 45 degrees with concurrent grit-blasting using 220 grit alumina at 60 psi. The optical micrographs further demonstrate that the first surface 11 of the sample was successfully coated while the cooling hole 12 in the coated sample is substantially free of any obstructions 32.

Figure 6:
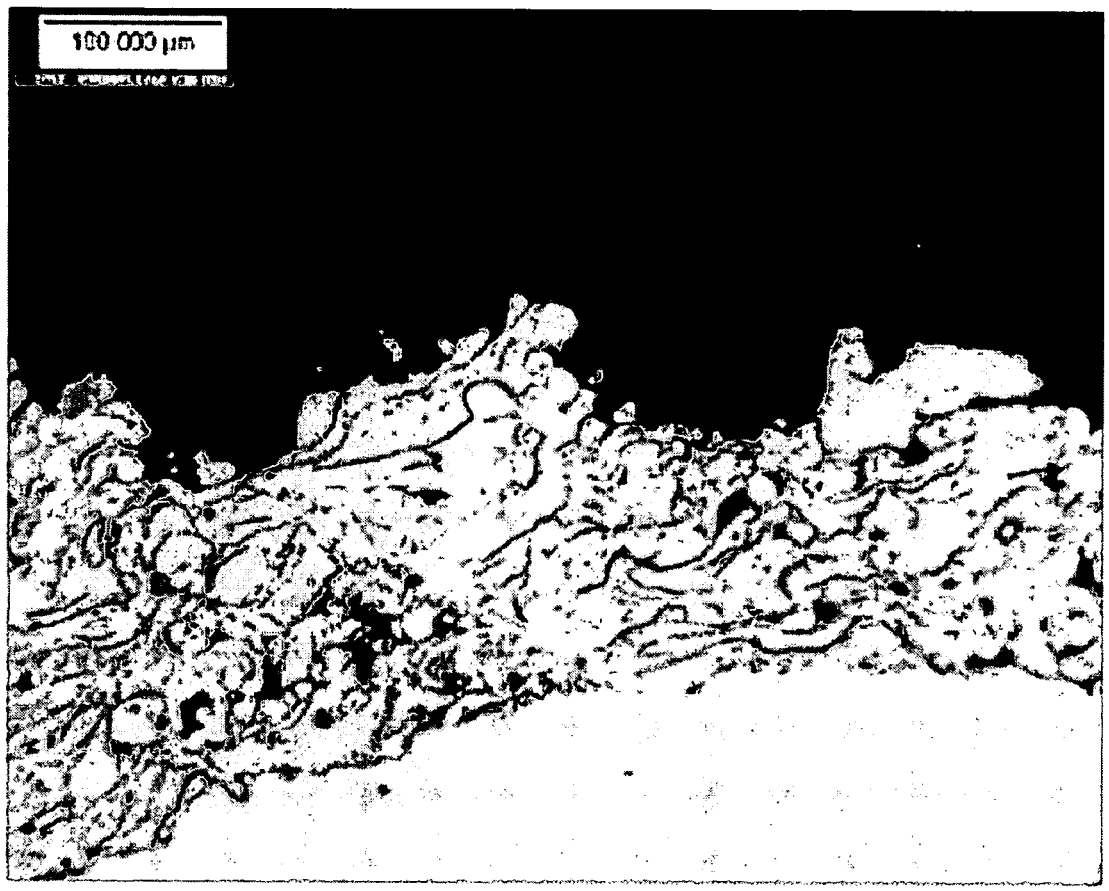
FIG. 6 is an optical micrograph of the microstructure of a coated surface of an article having a cooling hole following thermal spray and concurrent hole cleaning performed in accordance with an exemplary embodiment of the invention.

FIG. 6 is an optical micrograph of the microstructure of the first surface 11 of the sample and the overlying NiCrAlY TBC 22 illustrating that the microstructure of the first surface 11 and the TBC 22 is essentially unaltered by the concurrent cleaning process.

Although discussed with respect to combustor liners, it will be appreciated that the methods described herein can equally by applied with respect to any turbine engine component having cooling holes, including vanes, shrouds, and exhaust nozzles, by way of example only.

While the foregoing specification illustrates and describes exemplary embodiments of this invention, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method comprising:
providing an article having a first surface and an opposing second surface, the article having one or more cooling holes extending from an opening in the first surface to an opening in the second surface;
thermal spraying a layer of metallic material overlying the first surface of the article to form a metallic bond coat, wherein thermal spray debris creates an obstruction that at least partially obstructs at least one cooling hole; and
concurrently with the thermal spraying projecting a plurality of abrasive non-metallic particles entrained in a fluid toward the second surface of the article at a pressure in the range of about 30 psi to about 90 psi, at least some of the particles passing through the cooling hole at the second surface opening and removing at least a portion of the obstruction.

2. The method of claim 1, wherein the step of providing an article comprises providing a gas turbine engine component.

3. The method of claim 1, wherein the step of providing an article comprises providing an article selected from the group consisting of a combustor liner, a vane, a shroud, and an exhaust nozzle.

4. The method of claim 1, wherein the step of thermal spraying comprises thermal spraying a layer of MCrAlY, wherein M is Ni or Co.

5. The method of claim 1, wherein the step of thermal spraying comprises thermal spraying a layer of yttria stabilized zirconia over the metallic bond coat.

6. The method of claim 1, wherein the step of concurrently projecting particles comprises concurrently projecting particles having a grit size of about 60 mesh to about 400 mesh.

7. The method of claim 1, wherein the step of thermal spraying comprises thermal spraying at an angle of about 30 degrees to about 55 degrees with respect to the first surface.

8. The method of claim 1, wherein the step of concurrently projecting particles comprises concurrently projecting particles having a grit size of about 220 mesh and wherein the step of thermal spraying comprises thermal spraying at an angle of about 45 degrees with respect to the first surface.

9. The method of claim 1, wherein the step of concurrently projecting particles comprises concurrently projecting particles at about 60 psi.

10. The method of claim 1, wherein the step of concurrently projecting particles comprises concurrently projecting particles from a grit blaster having a plurality of outlet nozzles.

11. The method of claim 1, wherein the step of thermal spraying comprises thermal spraying a layer of MCrAlY material to a thickness of about 5 mils to about 10 mils, wherein M is Ni, Co or a combination thereof.

12. The method of claim 1, wherein the step of concurrently projecting particles comprises projecting particles toward the second surface within about 1 second of thermal spraying material to the first surface.

13. The method of claim 1, wherein the step of concurrently projecting particles comprises projecting particles toward the second surface within about 0.1 seconds of thermal spraying material to the first surface.

14. The method of claim 1, wherein the microstructure of the layer of thermally sprayed material is unaltered by the step of concurrently projecting particles.

15. The method of claim 1, wherein the step of concurrently projecting particles removes substantially all obstructions from the cooling hole.

16. The method of claim 1, wherein the step of concurrently projecting particles comprises concurrently projecting particles entrained in a gas.

17. A method comprising:
   providing a gas turbine engine component having a first surface and a second surface, the component having one or more cooling holes extending from an opening in the first surface to an opening in the second surface;
   applying a thermal barrier coating by thermal spraying a layer of metallic material overlying the first surface of the component to form a metallic bond coat, wherein metallic thermal spray debris creates an obstruction that at least partially obstructs at least one cooling hole;
   concurrently with the thermal spraying of the layer of metallic material projecting non-metallic abrasive particles toward the second surface of the component, at least some of the non-metallic abrasive particles passing into the cooling hole at the second surface opening, contact the obstruction therein and remove at least a portion of the obstruction therefrom; thereafter
   thermal spraying a layer of ceramic material overlying the metallic bond coat, wherein ceramic thermal spray debris creates another obstruction that at least partially obstructs at least one cooling hole; and
   concurrently with the thermal spraying of the layer of ceramic material projecting particles at a pressure in the range of about 30 psi to about 90 psi toward the second surface of the component, at least some of the particles passing into the cooling hole at the second surface opening, contact the another obstruction therein and remove at least a portion of the another obstruction therefrom.

18. The method of claim 17, wherein the microstructure of the applied thermal barrier coating is unaltered by the steps of concurrently projecting particles.

19. The method of claim 17, wherein the steps of concurrently projecting particles removes substantially all obstructions from the cooling hole.

* * * * *